United States Patent
Seki

(10) Patent No.: US 6,864,594 B2
(45) Date of Patent: Mar. 8, 2005

(54) FLUID POWER GENERATOR

(75) Inventor: Kazuichi Seki, Kanagawa (JP)

(73) Assignee: Tokai University Educational System, Tokyo (JP)

( * ) Notice: Subject to any disclaimer, the term of this patent is extended or adjusted under 35 U.S.C. 154(b) by 0 days.

(21) Appl. No.: 10/451,130

(22) PCT Filed: Nov. 8, 2002

(86) PCT No.: PCT/JP02/11654
§ 371 (c)(1),
(2), (4) Date: Jun. 19, 2003

(87) PCT Pub. No.: WO03/041264

PCT Pub. Date: May 15, 2003

(65) Prior Publication Data

US 2004/0041405 A1 Mar. 4, 2004

(30) Foreign Application Priority Data

Nov. 8, 2001 (JP) .................................. 2001-342927

(51) Int. Cl.[7] .................................................. F03D 7/04
(52) U.S. Cl. ........................................ 290/44; 290/55
(58) Field of Search .................... 290/44, 55, 4 R, 290/4 C, 43, 54; 318/147

(56) References Cited

U.S. PATENT DOCUMENTS

| | | | | |
|---|---|---|---|---|
| 4,651,017 A | * | 3/1987 | Longrigg | 290/44 |
| 5,089,766 A | * | 2/1992 | Iwatani | 322/25 |
| 5,155,375 A | * | 10/1992 | Holley | 290/44 |
| 5,483,435 A | * | 1/1996 | Uchino | 363/81 |

FOREIGN PATENT DOCUMENTS

| | | |
|---|---|---|
| JP | 57-46074 | 3/1982 |
| JP | 60-43100 | 3/1985 |
| JP | 8-322298 | 12/1996 |

* cited by examiner

Primary Examiner—Nicholas Ponomarenko
Assistant Examiner—Leda Pham
(74) Attorney, Agent, or Firm—Butzel Long

(57) ABSTRACT

In a fluid power generator system using operative fluid energy, a measured tip speed ratio and a reference tip speed ratio are compared with each other. If the measured tip speed ratio is smaller than the reference tip speed ratio, a generator is placed in a no-load state, thereby restoring the number of rotations of the wing axial shaft to the number of rotations corresponding to the reference tip speed ratio. Further, the operation of the generator is controlled on the basis of the tip speed ratio calculated from the flow rate of the fluid, thereby providing a maximum output for each flow rate. In this way, a change in the flow rate and number of rotations can be appropriately dealt with and the maximum output for each flow rate of the operative fluid can be dealt with, thereby increasing a quantity of generated power.

6 Claims, 4 Drawing Sheets

FLUID POWER GENERATOR

TECHNICAL FIELD

This invention relates to a fluid power generator system for converting operative fluid energy such as wind into rotary energy to be used as electric energy.

BACKGROUND ART

As a fluid power generator system which uses the operative fluid energy as a driving source to generate electric power, a wind vane generator using wind power energy has been proposed. In the field of this wind vane generator, the wind power energy, a demand of using wind power energy in a wide range from a breeze to strong wind has been enhanced.

The wind power generator system includes a generator which is driven by rotation of a wind turbine and a battery which is charged by power supply from the generator. In this wind power generator system, power can be supplied to loads such as an electric device while the battery is charged by the rotation of the wind turbine.

In the above conventional wind power generator system, even when there is a breeze blowing, the generator which serves as load for the wind turbine remains in a coupled state. Namely, the wind power generator system does not have a function of automatically decoupling the generator according to a change in the wind and coupling the wind turbine after the rotation of the wind turbine has been restored.

Where there is strong wind when the battery is in a full-charged state, the wind turbine is mechanically braked or the output from the generator is short-circuited to stop power generation, thereby preventing excessive rotation of the wind turbine. However, the moment that the output from the generator is short-circuited, the generator may become no load and the rotation of the wind turbine may become excessive.

An object of this invention is to provide a fluid power generator system which can deal with changes in the flow rate of an operative fluid such as wind and number of rotations (rotational speed) by controlling the tip speed ratio of a generator, thereby acquiring a maximum output at a specific flow rate.

DISCLOSURE OF THE INVENTION

In order to attain the above object, in accordance with this invention, there is provided a fluid power generator system comprising a generator coupled with a wing axial shaft which is rotated by operative fluid energy as a driving source and a load device including a battery connected to the generator, comprising a comparing means for comparing an measured tip speed ratio and a reference tip speed ratio, the measured tip speed ratio being calculated by a flow-rate signal based on a flow-rate of the operative fluid and a number of rotations signal based on the number of rotations of the wing axial shaft, and the reference tip speed ratio providing a maximum conversion efficiency of the operative fluid energy in the fluid power generator system; and a load control means for on/off controlling the load device so that if the measured tip speed ratio is smaller than the reference tip speed ratio as a result of comparison by the comparing means, the generator is placed in a no-load state, thereby restoring the number of rotations of the wing axial shaft to the number of rotations corresponding to the reference tip speed ratio.

Preferably, the load control means places the generator in the no-load state if the measured tip speed ratio is smaller than the reference tip speed ratio as a result of comparison by the comparing means and continues the no-load state until the number of rotations is restored to the number of rotations corresponding to the reference tip speed ratio, thereby dealing with a change in the number of rotations of the wind axial shaft.

Preferably, when the battery of the load device is fully charged, power supply to the battery is stopped by an output from an excessive voltage detecting unit and a dummy load is connected to the generator.

Further, there is provided a fluid power generator system comprising a generator coupled with a wing axial shaft which is rotated by operative fluid energy as a driving source, comprising a control means for controlling the operation of the generator on the basis of a measured tip speed ratio which is calculated by a measured flow-rate of the operative fluid and a measured number of rotations of the wing axial shaft, thereby providing a maximum output for a specific flow-rate of the operative fluid.

Preferably, the control means constantly controls the operation of the generator on the basis of a measured tip speed ratio which is calculated from a measured flow rate of the operative fluid and higher number of rotations exceeding an output peak value at the measured number of rotations of the axial shaft, so that a maximum output for the specific flow rate of the fluid is obtained by load given to the wing axial shaft.

BEST MODE FOR CARRYING OUT THE INVENTION

Figure 1:
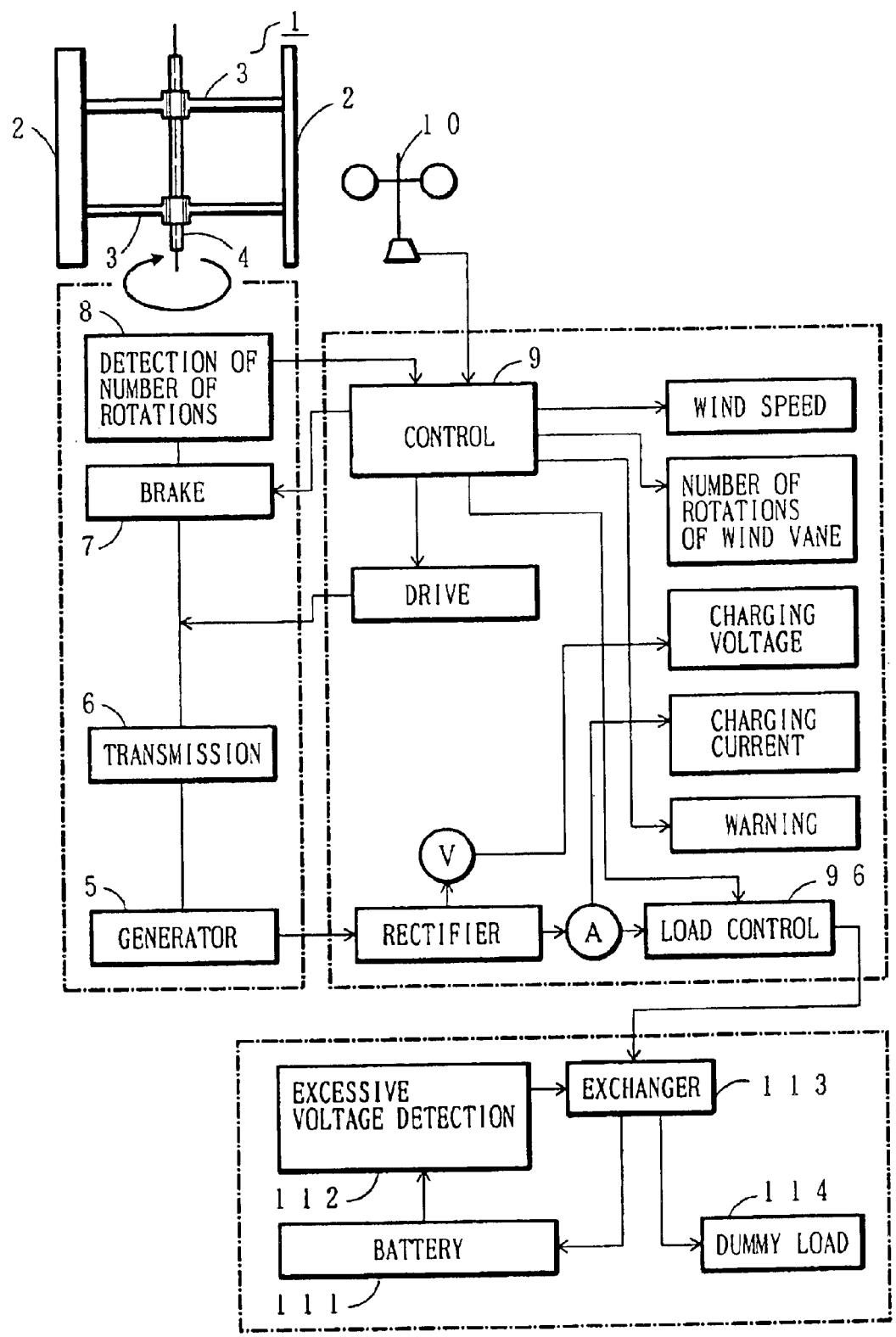
FIG. 1 is a block diagram showing an embodiment of this invention.

Now referring to the drawings, an explanation will be given of an embodiment of this invention.

FIG. 1 shows an arrangement of the wind power generator which converts wind power energy serving as operative fluid energy into rotary energy to be used as electric energy;

In FIG. 1, a wind turbine 1 includes e.g. linear blades 2 which are integrally attached to a wing axial shaft 4 by upper and lower supporting blades 3, respectively. The wing rotary shaft 4 is coupled with a generator 5 such as a synchronous generator (three-phase AC) through a transmission. The wing axial shaft 4 is provided with a brake 7 and a revolving number detecting unit 8 for the number of rotations of the wind turbine 1.

The revolving number detecting unit 8 serves to detect the number of rotations of the wind turbine 1 with the aid of a tachometer generator and a photosensor and photovoltaic converter. This detected number-of-revolution signal is supplied to a control circuit 9. The wind speed is detected by a wind speed detecting unit 10 such as a wind speed indicator, and the detected wind speed signal is supplied to a control circuit 9.

Figure 2:
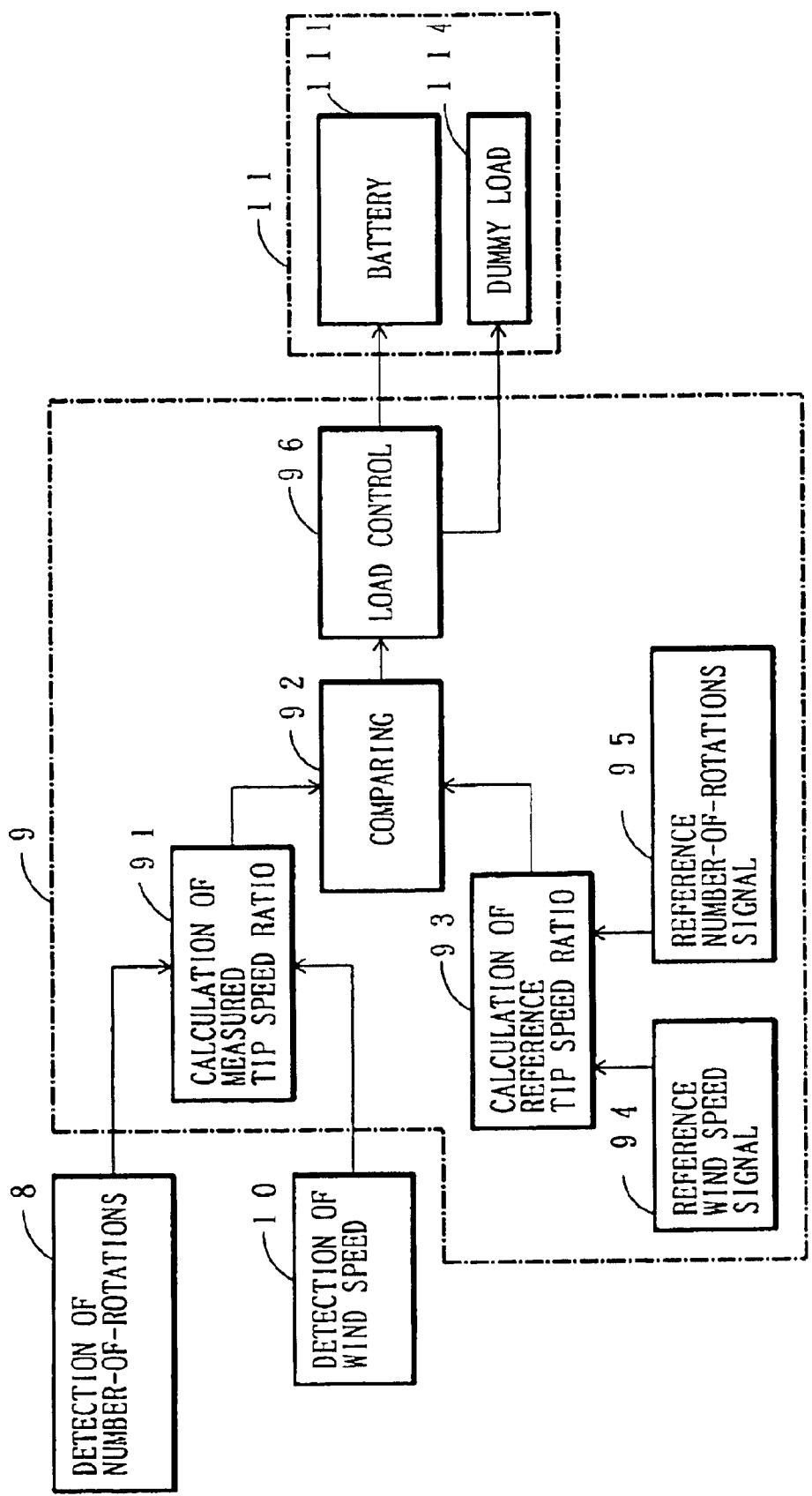
FIG. 2 is a block diagram of a control circuit.

FIG. 2 shows the main portion of the control circuit 9 in FIG. 1. The number of rotations of the wing axial shaft 4 is detected by the number of rotations detecting unit 8. The number of rotations signal of the wing axial shaft is supplied to a tip speed ratio calculating circuit 91 for calculating an measured tip speed ratio in the control circuit 9. The wind speed signal detected by the wind speed detecting unit is also supplied to the measured tip speed ratio calculating circuit 91.

The measured tip speed ratio calculating circuit 91 calculates the measured tip speed ratio from the number of rotations signal based on the number of rotations of the wing axial shaft 4 and the wind speed signal based on the wind speed. The measured tip speed ratio is supplied to a comparing circuit (comparing means) 92. The comparing circuit 92 also receives a reference tip speed ratio. The reference tip speed ratio is previously set at a value where the conversion efficiency of wind power is maximum in the wind power generator system in FIG. 1.

On the basis of a comparison result between the measured tip speed ratio and the reference tip speed ratio, the comparing circuit 92 supplies a control signal to a load control circuit 96. As a result of comparison, if the measured tip speed ratio is smaller than the reference tip speed ratio, the comparing circuit 92 issues a command of turning off a battery 111 of the load device 11 and an electric contact of the generator 5 to a load control circuit 96. The load control circuit 96 causes an exchanger 113 to place the generator 5 in a no-load state. The operation of placing the generator 5 in the no-load state can be easily implemented using an unload valve.

In this way, if the measured tip speed ratio is smaller than the reference tip speed ratio, the generator 5 is placed in the no-load state to reduce the load for the wing axial shaft 4. This operation will be continued until the number of rotations of the wind axial shaft is restored to that corresponding to the reference tip speed ratio. Thus, the start of the rotation of the wind turbine 1 is greatly accelerated so that the wind power generator system can sensitively deal with changes in the wind speed and number of rotations. This improves the power generation efficiency and hence the net working rate of the wind power generator system.

In the load device 11, if the battery 111 is in a fully-charged state, in response to the output from an excessive voltage detecting circuit 112, the exchanger 113 stops the power supply to the battery 111 and connects a dummy load 114 to the generator 5. Thus, the generator 5 is not placed in the no-load state so that suitable braking is applied. Accordingly, the wing axial shaft 4 coupled with the generator 5, i.e. the wind turbine 1 is prevented from falling into an excessive rotary range so that the linear blades 2 of the wind turbine 1 is prevented from being damaged. The dummy load 114 may be given by turning on lights or operating a connected heater for heat recovery. Thus, the surplus power can be effectively used until the full-charged state of the battery 111 is dissolved.

Figure 5:
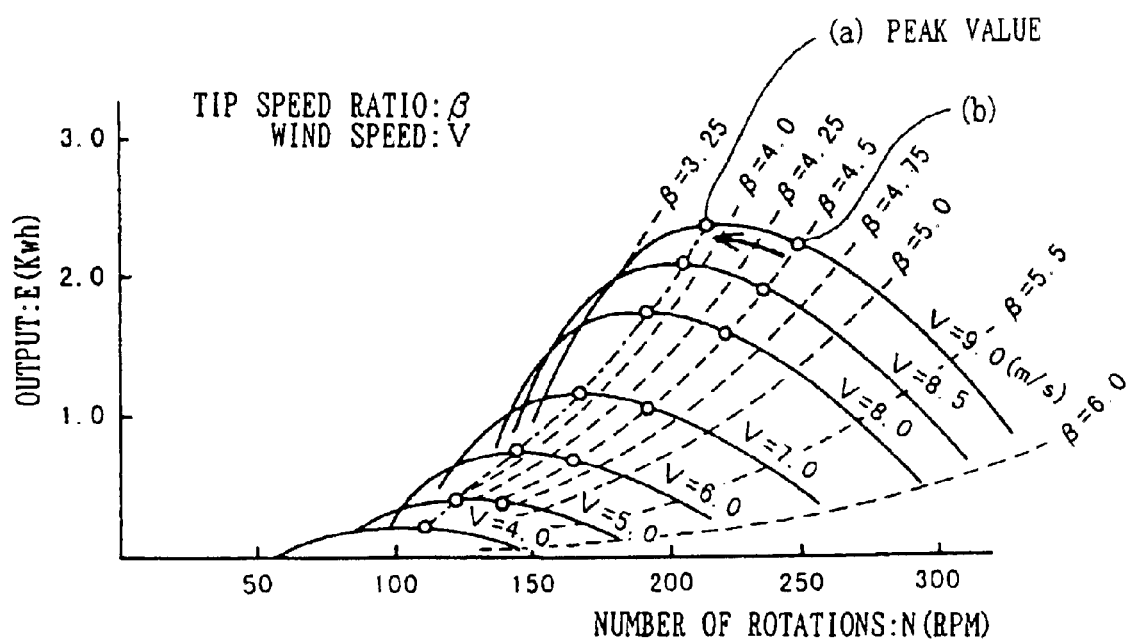
FIG. 5 is a characteristic view showing an example of control of the tip speed ratio.

In the embodiment shown in FIG. 1, the operation of each of the generators A to G can be controlled on the basis of the tip speed ratio $\beta$ ($\beta$=number of rotations N or rotor tip speed/wind speed V) which has been calculated from the wind speed V and the number of rotations N of the wind rotary shaft 4. The rotor tip speed is represented by $2\pi RN$ (R is a diameter). Assuming that $2\pi R$ is constant, the rotor tip speed can be replaced by the number of rotations N. Specifically, as shown in FIG. 5, when the generator (e.g. A) is coupled with the wind rotary shaft 13 at a higher number of rotations, i.e. point (b) ($\beta$=4.5) exceeding a peak value, i.e. point (a) of the wind speed V=9 m/sec., the generator serves as a load for the wind rotary shaft 13. As a result, the number of rotations N of the wing rotary shaft 13 decreases like an counterclockwise arrow in FIG. 5 and reaches the peak value, i.e. point (a) of the output.

Because the maximum efficiency of the wind turbine 1 is actually obtained at the tip speed ratio $\beta$=4.5, the operation should be made in the vicinity of $\beta$=4.5. In this way, by controlling each of the generators A to G on the tip speed ratio, as seen from FIGS. 5 and 6, these generators A to G can be operated at the peak value, i.e. point (a) so that the maximum output according to a specific wind speed can be obtained.

Figure 3:
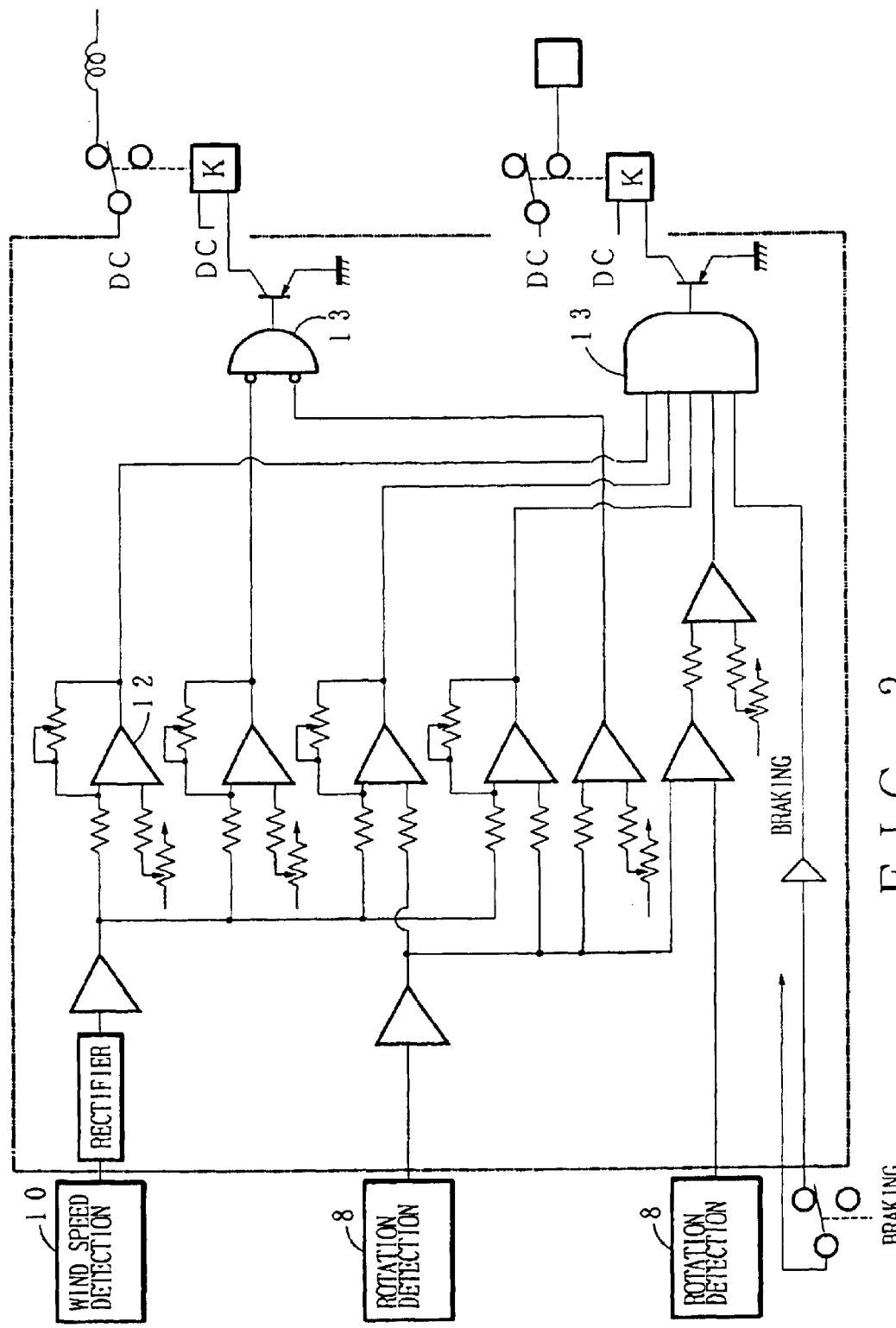
FIG. 3 is a conceptual view showing a control system.
Figure 4:
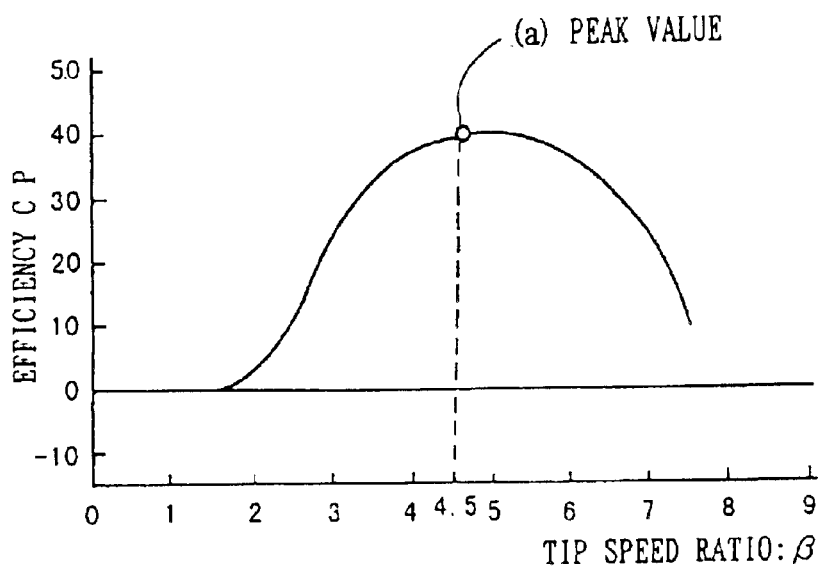
FIG. 4 is a characteristic view of power generation efficiency versus a tip speed ratio.

FIG. 3 is a conceptual view showing the control system of the wind power generator system shown in FIG. 1. This control system has three functions of a start-up and accelerating function, tip speed ratio control function and a braking function. The wind speed is detected by a wind speed detecting unit 10 which may be an anemometer. The number of rotations of the wind turbine 1 is detected by the number of rotations detecting unit 8 which includes a tachometer generator and measurement by a photosensor and photovoltaic converter. These wind speed signal and number of rotations signal are processed by a voltage comparator 12 and a logic circuit 13 and are produced as control signals.

The start-up and accelerating function is to operate a start motor when the wind speed exceeds a certain minimum value and the tip speed ratio of the wind turbine 1 is lower than a prescribed value. The tip speed ratio control function is to operate an unload valve to place the generator in a no-load state when the tip speed ratio is lower than a maximum value. This state continues until the number-of-revolution of the wind turbine 1 is restored to the reference number of rotations to deal with a change in the number of rotations.

The braking function includes two functions inclusive of a normal braking function and an emergency braking function. The normal braking function is to operate an air brake when the wind speed exceeds a designed maximum value. The emergency braking function is to operate the air brake when the wind speed exceeds the designed maximum value and also the detected signals from the two number of rotations detecting units 8 are abnormal.

The braking system includes a braking system by a cut-out wind speed and an emergency braking system by excessive rotation by the wind turbine 1. Particularly, the braking system has a function of self-diagnosis for detecting abnormality of the number of rotations which is important from the viewpoint of safety.

This invention should not be limited to the above embodiment which has been explained in the wind power generator system. The fluid power generator system according to this invention can be applied to a water power or other generating system. This invention can be implemented in combination with solar power generation as a hybrid power generator system.

The fluid power generator system can be equipped with control means which can monitor various observed data indicative of a generated power, number of rotations, flow rate, etc. or video data capable of monitoring an operating status by using a communication means such as satellite communication or internet on any site on the earth, thereby implementing the operation in bi-directional communication.

On the side wall of a high building, the axial shaft may be located not vertically but horizontally. In place of the supporting blade, a disk serving as a supporting portion can be employed.

INDUSTRIAL APPLICABILITY

In accordance with the invention described in claim 1, in the fluid power generator, a change in the flow-rate and number of rotations can be appropriately dealt with so that the power generation efficiency can be improved. This improves the operation efficiency of the fluid power generator system and increases the generated power.

In accordance with the invention described in claim 2, when the flow rate becomes lower than the reference level, the generator is automatically placed in the no-load state so that the burden for the wing axial shaft can be relaxed and the no-load state can be continued until the number of rotations is restored to the reference number of rotations. Therefore, a change in the flow-rate and number of rotations can be appropriately dealt with so that the power generation efficiency. This improves the operation efficiency of the fluid power generator system and increases the generated power.

In accordance with the invention described in claim 3, since the battery is fully charged, power supply to the battery from the generator is stopped and the dummy load is coupled with the generator. Therefore, the generator is not placed in the no-load state so that suitable, electric braking can be applied. Thus, the rotating unit at high speed rotation can be prevented from being damaged. Further, by using the heater or the like as the dummy load, the surplus power can be effectively used until the fully-charged state of the battery is released.

In accordance with the invention described in claim 4, by controlling the operation of the generator on the basis of the tip speed ratio which is calculated from the flow rate and the number of rotations, the maximum output for each flow rate of the operative fluid can be obtained. This improves the operation efficiency of the fluid power generator system and increases the generated power.

In accordance with the invention described in claim 4, by controlling the operation of the generator on the basis of the tip speed ratio which is calculated from the flow rate of the operative fluid and the higher number of rotations exceeding an output peak value at the measured number of rotations of the axial shaft, the maximum output for each flow rate of the operative fluid can be obtained. This improves the operation efficiency of the fluid power generator system and increases the generated power.

What is claimed is:

1. A fluid power generator system including a generator coupled with a wing axial shaft which is rotated by operative fluid energy as a driving source and a load device including a battery connected to the generator, the fluid power generator system comprises:

a comparing means for comparing an measured tip speed ratio, said measured tip speed ratio being calculated by a flow-rate signal based on a flow-rate of the operative fluid and a number of rotations based on the number of rotations of said wing axial shaft, and said reference tip speed ratio providing a maximum conversion efficiency of the operative fluid energy in said fluid power generator system; and a load control means for on/off controlling said load device so that if said measured tip speed ratio is smaller than said reference tip speed ratio as a result of comparison by said comparing means, said generator is placed in a no-load state, thereby restoring the number of rotations of said wing axial shaft to the number or rotations corresponding to said reference tip speed ratio said load control means being independent means for controlling a load which is applied to the generator; and a braking including a revolving number detecting unit for detecting the number of revolutions of said wing axial shaft and a brake unit for braking the rotation of the wing, said braking means operating the brake when the flow-rate of the operative fluid exceeds a designated maximum value or when a detected signal form the revolving number detecting unit is abnormal.

2. A fluid power generator system according to claim 1, wherein said load control means places said generator in the no-load state if said measured tip speed ratio is smaller than said reference tip speed ratio as a result of comparison by said comparing means and continues the no-load state until said number of rotations is restored to the number of rotations corresponding to said reference tip speed ratio, thereby dealing with a change in the number of rotations of said wing axial shaft.

3. A fluid power generator system according to claim 1, wherein when the battery of said load device is fully charged, power supply to said battery is stopped by an output form an excessive voltage detecting unit and a dummy load is connected to said generator.

4. A fluid power generator system having a generator coupled with a wing axial shaft which is rotated by operative fluid energy as a driving source, said fluid power generator comprising a control means for controlling the operation of said generator on the basis of a measured tip speed which is calculated by a measured flow-rate of the operative fluid and a measured number of rotations of said wind axial shaft, thereby providing a maximum output for each flow-rate of the operative fluid; and a braking means including a revolving number detecting unit for detecting the number of rotations of said wing axial shaft and a brake for braking the rotation of the wing, the braking means controlling the rotational speed of the wiring axial shaft.

5. A fluid power generator system according to claim 4, wherein said control means constantly controls the operation of said generator on the basis of a measured tips speed ratio which is calculated from a measured flow rat of the operative fluid and higher number of rotations exceeding an output peak value at the measured number of rotations of the axial shaft, so that a maximum output for each flow rate of the fluid is obtained by a load given to said wing axial shaft.

6. A fluid power generator system according to claim 1, wherein when the battery of said load device is fully charged, power supply to said battery is stopped by an output form an excessive voltage detecting unit and a dummy load is connected to said generator.

* * * * *